US011972723B2

(12) United States Patent
Foo et al.

(10) Patent No.: US 11,972,723 B2
(45) Date of Patent: Apr. 30, 2024

(54) MAINTAINING LUMINANCE WHEN REFRESH RATE CHANGES

(71) Applicant: GOOGLE LLC, Mountain View, CA (US)

(72) Inventors: Ken Kok Foo, Sunnyvale, CA (US); John William Kaehler, Mountain View, CA (US); Chien-Hui Wen, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/593,414

(22) PCT Filed: Aug. 21, 2020

(86) PCT No.: PCT/US2020/070442
§ 371 (c)(1), (2) Date: Sep. 17, 2021

(87) PCT Pub. No.: WO2022/039776
PCT Pub. Date: Feb. 24, 2022

(65) Prior Publication Data
US 2022/0270547 A1 Aug. 25, 2022

(51) Int. Cl.
*G09G 3/3208* (2016.01)

(52) U.S. Cl.
CPC ... *G09G 3/3208* (2013.01); *G09G 2320/0247* (2013.01); *G09G 2320/0626* (2013.01); *G09G 2340/0435* (2013.01)

(58) Field of Classification Search
CPC .. G09G 3/20; G09G 3/3208; G09G 2330/021; G09G 2320/0626; G09G 2320/0271; G09G 2340/0435; G09G 2320/0247
See application file for complete search history.

(56) References Cited

U.S. PATENT DOCUMENTS

| | | | | |
|---|---|---|---|---|
| 6,795,063 | B2 | 9/2004 | Endo et al. | |
| 9,341,908 | B2 | 5/2016 | Kimura | |
| 10,460,655 | B2 | 10/2019 | Zhang et al. | |
| 2014/0267448 | A1 | 9/2014 | Albrecht et al. | |
| 2017/0243548 | A1 * | 8/2017 | Wang | G09G 3/20 |
| 2019/0325821 | A1 | 10/2019 | Pyo et al. | |

(Continued)

FOREIGN PATENT DOCUMENTS

CN 111243480 * 6/2020

OTHER PUBLICATIONS

Invitation to Pay Additional Fees in International Appln. No. PCT/US2020/070442, dated Mar. 11, 2021, 9 pages.

(Continued)

*Primary Examiner* — Shaheda A Abdin
(74) *Attorney, Agent, or Firm* — Fish & Richardson P.C.

(57) ABSTRACT

A non-transitory computer-readable storage medium can include instructions stored thereon that, when executed by at least one processor, are configured to cause a computing device to determine, in response to a change in a refresh rate of a display, an encoded intensity of at least a portion of an image presented by the display, determine that the encoded intensity is within a predetermined range, and based on determining that the encoded intensity is within the predetermined range, adjust an intensity of a signal for the portion of the image.

22 Claims, 13 Drawing Sheets

(56) References Cited

U.S. PATENT DOCUMENTS

| | | | | |
|---|---|---|---|---|
| 2022/0051599 | A1* | 2/2022 | Kang | G09G 3/20 |
| 2022/0051630 | A1* | 2/2022 | Shen | G09G 3/3275 |
| 2022/0130317 | A1* | 4/2022 | Lan | G09G 3/3614 |
| 2022/0309977 | A1* | 9/2022 | Lu | G09G 5/14 |
| 2022/0328015 | A1* | 10/2022 | Sun | G09G 3/3406 |

OTHER PUBLICATIONS

International Search Report and Written Opinion for PCT Application No. PCT/US2020/070442, dated May 21, 2021, 14 pages.

International Preliminary Report on Patentability in International Appln. No. PCT/US2020/070442, dated Mar. 2, 2023, 10 pages.

* cited by examiner

Lookup table 300

| Encoded intensity 302 | Adjustment value 304 |
|---|---|
| 20 | 0 |
| 25 | 0 |
| 30 | 5 |
| 35 | 6 |
| 40 | 7 |
| 45 | 4 |
| 50 | 3 |
| 55 | 0 |
| 60 | 0 |

FIG. 3

MAINTAINING LUMINANCE WHEN REFRESH RATE CHANGES

CROSS REFERENCE TO RELATED APPLICATION

This application is a 35 U.S.C. § 371 National Stage Entry from PCT/US2020/070442, filed Aug. 21, 2020, the disclosure of which is hereby incorporated by reference.

TECHNICAL FIELD

This description relates to computer graphics.

BACKGROUND

Displays for computing devices can have modifiable refresh rates, or rates of updating or changing pixel content. Lower refresh rates can reduce power consumption, increasing battery life, whereas higher refresh rates can improve graphical output.

SUMMARY

According to an example, a non-transitory computer-readable storage medium can include instructions stored thereon that, when executed by at least one processor, are configured to cause a computing device to determine, in response to a change in a refresh rate of a display, an encoded intensity of at least a portion of an image presented by the display, determine that the encoded intensity is within a predetermined range, and based on determining that the encoded intensity is within the predetermined range, adjust an intensity of a signal for the portion of the image.

According to an example, a method can include measuring a first luminance of a display when the display is presenting an image with a first encoded intensity and a first refresh rate, measuring a second luminance of the display when the display is presenting the image with the first encoded intensity and a second refresh rate, and storing a difference between the first luminance and the second luminance.

According to an example, a method can include determining, by a computing device in response to a change in a refresh rate of a display, an encoded intensity of at least a portion of an image presented by the display, determining that the encoded intensity is within a predetermined range, and based on determining that the encoded intensity is within the predetermined range, adjusting an intensity of a signal for the portion of the image.

The details of one or more implementations are set forth in the accompanying drawings and the description below. Other features will be apparent from the description and drawings, and from the claims.

BRIEF DESCRIPTION OF THE DRAWINGS

FIG. 3 shows a lookup table associating encoded intensity with adjustment values.

DETAILED DESCRIPTION

A computing device can maintain a low refresh rate of a display to save power when less graphic-intensive applications are running and can increase the refresh rate when a more graphic-intensive application, such as a gaming application, is running on the computing device. Increasing the refresh rate can increase a luminance, or intensity of light emitted from the display. The increased luminance can cause the display to appear to flicker when the refresh rate transitions from the low refresh rate to the high refresh rate. To reduce the flicker, the computing device can reduce the intensity of the signals provided to the display, and/or to pixels included in the display, when the refresh rate increases, to maintain a same luminance.

Figure 1A:
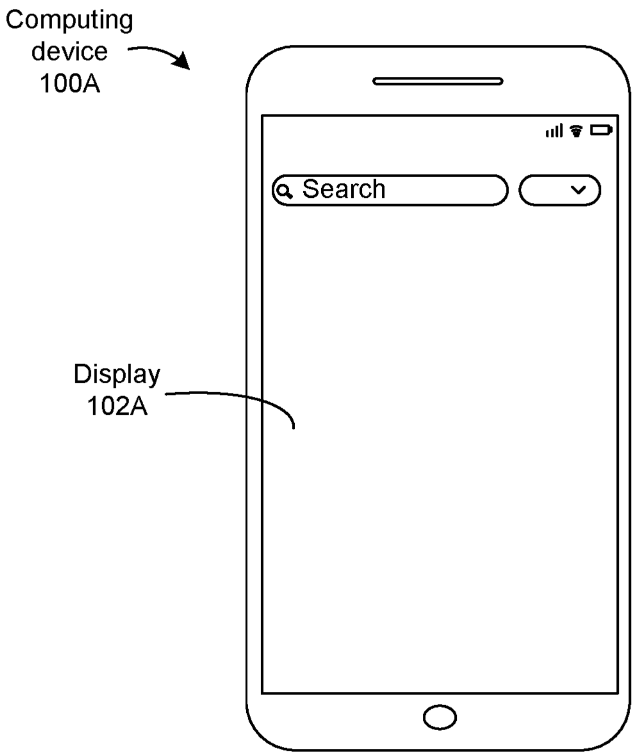
FIGS. 1A and 1B shows two views of a computing device displaying two different images.
Figure 1B:
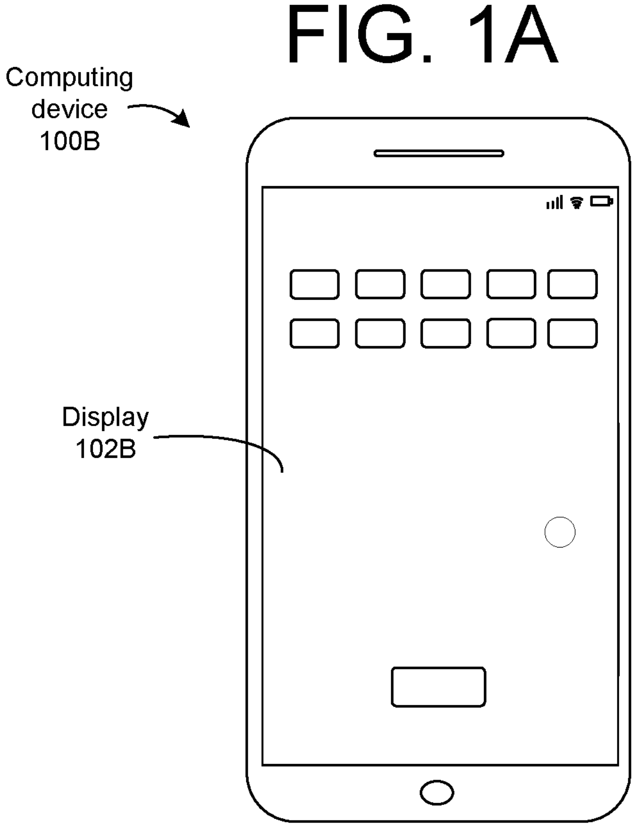

FIGS. 1A and 1B shows two views of a computing device 100A, 110B displaying two different images. The two views of the computing device 100A, 110B can represent the same computing device (referred to as computing device 100) presenting different images on a display 102A, 102B included in the computing device 100A, 100B. The computing device 100 can include any computing device with a display for outputting graphical content, such as a smartphone, a tablet computer, a laptop or notebook computer, or a desktop computer with a display, as non-limiting examples. In the first view, the display 102A presents a web browser, which is an example of a less graphic-intensive application. Other examples of less graphic-intensive applications are word processing applications, spreadsheet applications, or electronic messaging applications.

In the second view, the display 102B presents a video game, which is an example of a more graphic-intensive application. Another example of a more graphic-intensive application is a video application.

The computing device 100 can display content on the display 102A, 102B at more than one refresh rate. For example, relatively less graphic-intensive applications can be displayed at a low refresh rate and relatively more graphic-intensive applications can be displayed at a high refresh rate. In response to the display 102A, 102B changing from displaying a less graphic-intensive application to displaying a more graphic-intensive application, the computing device 100 can increase the refresh rate of the display 102B (which can also be referred to as display 102). As explained in more detail herein, without adjustment, increasing the refresh rate may increase a luminance of the image presented by the display 102. To maintain a same luminance, the computing device 100 can reduce an intensity of a signal(s) sent to pixels on the display 102, compensating for the increase in luminance caused by the increase in the refresh rate, and/or increase an intensity of a signal(s) sent to pixels on the display 102 to compensate for a decrease in luminance caused by a decrease in the refresh rate.

The display 102 can present, provide, output, and/or display graphical and/or visual output. In some examples, the display 102 can include a touchscreen display that receives touch input, such as a capacitive touchscreen display and/or a resistive touchscreen display. The display 102 can include a light-emitting diode (LED) display, such as an organic LED (OLED) display and/or active-matrix organic LED (AMOLED) display, as non-limiting examples.

In some examples, the increase in luminance caused by the increase in the refresh rate is more noticeable to humans at certain encoded intensity levels. An encoded intensity level can be based on pixel values sent, outputted, and/or provided to the display 102, such as red, green, and blue values in an RGB color model. An example of an encoded intensity level can be a gray level. The gray level can be an average value of the color components, such as red, green, and blue, for a pixel in the RGB color model, or a weighted average, such as 0.299 times the red value, plus 0.587 times the green value, plus 0.114 times the blue value in the RGB color model. In the YCbCr color model, the gray value can be the Y or luma component.

In some examples, the computing device 100 maintains the luminance in response to the increase in the refresh rate only if the encoded intensity value and/or gray value is within a predetermined range, such as a gray value of between thirty and fifty in an RGB color model in which each of red, green, and blue has a value between 0 and 255. In some examples, if the encoded intensity value is within the predetermined range, then the computing device 100 will maintain the luminance by adjusting an intensity of a signal(s) sent to a pixel and/or multiple pixels in the display 102 by a fixed value independent of the specific encoded intensity value. In some examples, the computing device 100 can adjust the intensity of the signal(s) by a specific value for each encoded intensity level, such as by checking a lookup table to determine an adjustment level for the signal(s) based on the encoded intensity level (as used herein, “adjustment level” and “adjustment value” can be used interchangeably). In some examples, the computing device 100 can adjust the intensity of the signal by a specific value for each specific transition between refresh rates, such as from sixty Hertz to ninety Hertz, from thirty Hertz to sixty Hertz, or from thirty Hertz to ninety Hertz, from ten Hertz to fifteen Hertz, from ten Hertz to sixty Hertz, from ten Hertz to one hundred and twenty Hertz, from ten Hertz to two hundred and forty Hertz, from fifteen Hertz to sixty Hertz, from fifteen Hertz to one hundred and twenty Hertz, from fifteen Hertz to two hundred and forty Hertz, or a reversal of these refresh rates such as from ninety Hertz to sixty Hertz, and/or based on a combination of the refresh rate transition and the encoded intensity level. In some examples, the computing device 100 can adjust the intensity of the signal in an opposite direction, by a same absolute value, when the refresh rate transitions in an opposite direction between same values, such as by increasing the intensity of the signal when the refresh rate transitions from ninety Hertz to sixty Hertz by a same value as the computing device 100 decreased the intensity of the signal when the refresh rate transitioned from sixty Hertz to ninety Hertz for a same encoded intensity level.

Figure 2A:
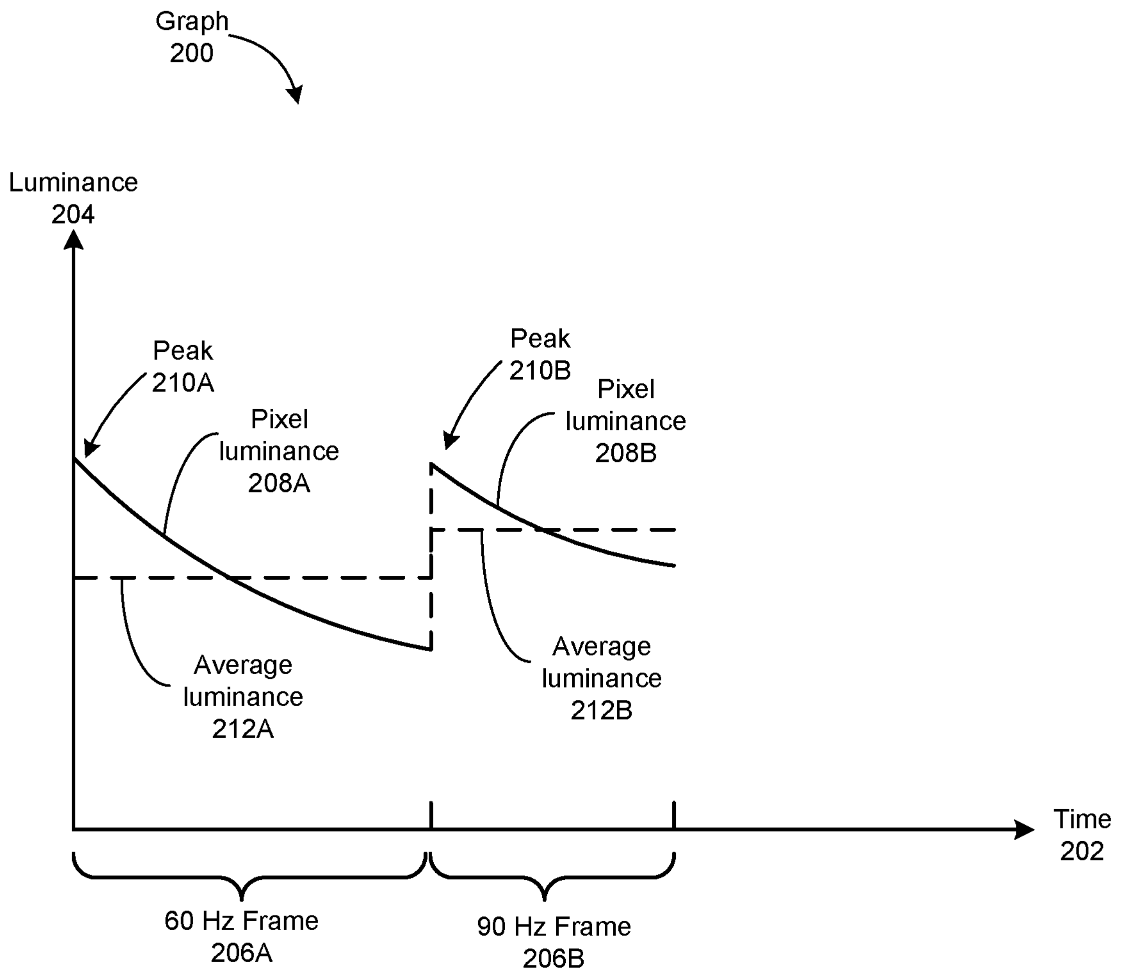
FIG. 2A shows a graph with luminance as a function as time for a single pixel through two refresh cycles with different refresh rates.

FIG. 2A shows a graph with luminance 204 as a function of time 202 for a single pixel through two refresh cycles 206A, 206B with different refresh rates. A first refresh cycle 206A and/or frame can be while the display 102 has a lower refresh rate such as sixty Hertz (60 Hz), and a second refresh cycle 206B and/or frame can be while the display has a greater refresh rate such ninety Hertz (90 Hz). During both refresh cycles 206A, 206B, the encoded intensity and/or gray level can be the same, and an intensity of a signal sent to the pixel can be the same. The same intensity of the signal can cause a peak 210A, 210B of the pixel luminance 208A, 208B for each cycle 206A, 206B and/or frame to be the same. However, because the luminance 208A of the pixel decays for a longer period of time during the cycle 206A and/or frame with the lower refresh rate than the luminance 208B of the pixel during the cycle 206B and/or frame with the lower refresh rate, the pixel has a lower average luminance 212A during the cycle 206A and/or frame with the lower refresh rate than the average luminance 212B of the pixel during the cycle 206B and/or frame with the higher refresh rate. The higher average luminance 212B of the pixel during the cycle 206B and/or frame with the higher refresh rate than the average luminance 212B of the pixel during the cycle 206A and/or frame can cause the display 102 to appear to flicker when the refresh rate increases.

Figure 2B:
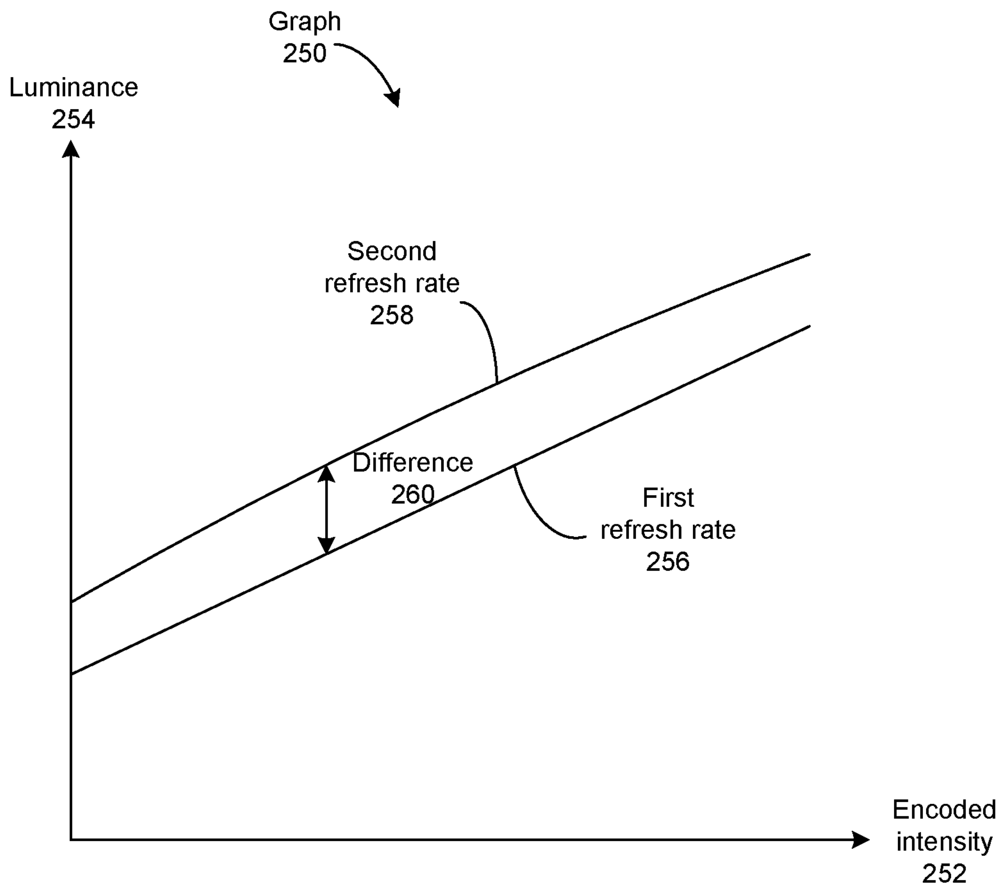
FIG. 2B shows a graph with luminance as a function of encoded intensity for two different refresh rates.

FIG. 2B shows a graph 250 with luminance 254 as a function of encoded intensity 252 for two different refresh rates 256, 258. Encoded intensity 252 represents values inputted to the display 102, and can be a function of red, green, and blue values for pixels in an RGB color model. The encoded intensity 252 can, for example, represent a gray level, which can be an average value of the red, green, and blue color components, or a weighted average, such as 0.299 times the red value plus 0.587 times the green value plus 0.114 times the blue value. In examples in which the computing device 100 adjusts the intensity of the signal sent to each pixel individually and/or can adjust the pixels by different amounts than other pixels to maintain the same luminance for each pixel individually, the computing device 100 can determine encoded intensity levels for each pixel individually. In examples in which the computing device 100 adjusts the intensity of signals for all pixels in the display 102 by a same value to maintain a same luminance, the encoded intensity 252 can represent an overall encoded intensity for the display 102. In the examples in which the computing device 100 adjusts the intensity of signals for all pixels in the display 102 by a same value to maintain the same luminance, the computing device 100 can determine the overall encoded intensity 252 by determining an encoded intensity level for each pixel individually, and determine the overall encoded intensity 252 as a function of the determined encoded intensity levels of the individual pixels. The computing device 100 can, for example, determine the overall encoded intensity 252 as a mean of the determined encoded intensity levels of the individual pixels, a median of the encoded intensity levels of the individual pixels, an encoded intensity level that is greater than the encoded intensity levels of some predetermined fraction of pixels included in the display 102 such as twenty-five percent of the individual pixels or seventy-five percent of the individual pixels, as non-limiting examples.

The luminance 254 can represent an average luminous intensity of light emitted by the display 102 such as the average luminance 212A, 212B shown in FIG. 2A, an amount of light emitted from the display 102, and/or a photometric measure of the light emitted by the display 102. For a given encoded intensity value 252, a different refresh rate can cause the display 102 to output a different luminance 254. For example, the luminance 254 for a given encoded intensity 252 can be lower for a first refresh rate 256, such as sixty Hertz, than for a second refresh rate 258, such as ninety Hertz. A difference 260 between the luminance 254 values for different refresh rates 256, 258 with a same encoded intensity 252 level can be constant across encoded intensity 252 levels, can be constant within predetermined ranges of encoded intensity 252 levels (such as between gray level values of thirty and fifty), or can be different for each encoded intensity 252 level.

The computing device 100 can adjust the intensity of signals provided to the pixels in response to a change in the refresh rate to maintain a same luminance 254, based on the previously-measured difference 260. In some examples, the computing device 100 can adjust the intensity of signals by a single stored value if the encoded intensity 252 is within a single predefined range, and not adjust the intensity of signals if the encoded intensity 252 is outside the predefined range. In some examples, the computing device 100 can adjust the intensity of signals provided to the pixels by a different value for each encoded intensity 252 level, such as by checking a lookup table to determine the adjustment level.

Figure 2C:
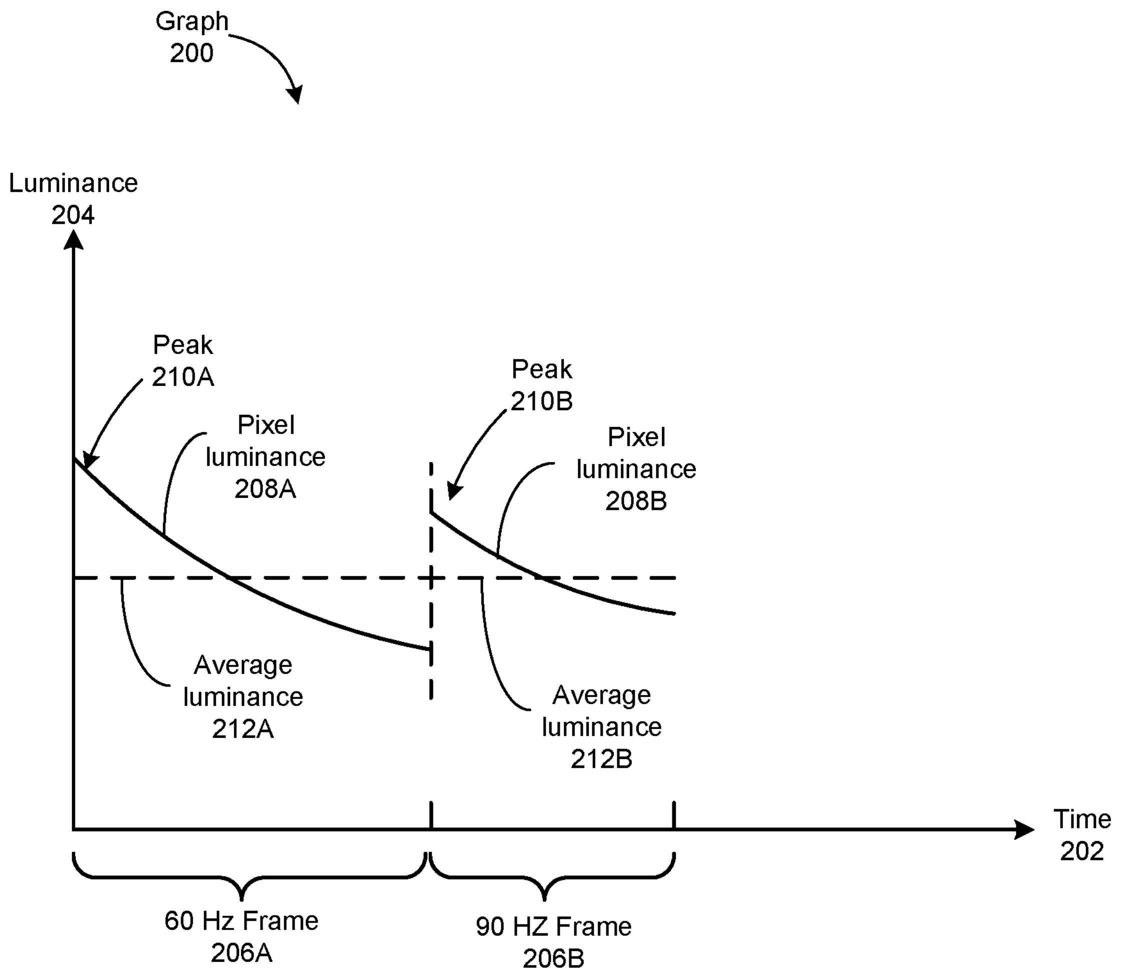
FIG. 2C shows a graph with luminance as a function as time for a single pixel through two refresh cycles with different refresh rates where average luminance is maintained.

FIG. 2C shows a graph with luminance 204 as a function of time 202 for a single pixel through two refresh cycles 206A, 206B with different refresh rates where average luminance 212A, 212B is maintained. A peak intensity over a single refresh cycle can be adjusted, changing the average intensity over the same refresh cycle. In this example, as compared to the example shown in FIG. 2A, the computing device 100 reduces the intensity of the signal provided to the pixel during the second cycle 206B and/or frame, causing the peak luminance 210B during the second cycle 206B and/or frame to be lower than the peak luminance 210A during the first cycle 206A and/or frame. The lower peak luminance 210B during the second cycle 206B and/or frame reduces the average luminance 212B during the second cycle 206B and/or frame, causing the average luminance 212B during the second cycle 206B and/or frame to be the same as the average luminance 212A during the first cycle 206A and/or frame. The reduction in average luminance 212B during the second cycle 206B and/or frame to be the same as the average luminance 212A during the first cycle 206A and/or frame eliminates the flicker during the transition from the lower refresh rate to the higher refresh rate.

FIG. 3 shows a lookup table 300 associating encoded intensity 302 with adjustment values 304. The lookup table 300 can be associated with a particular refresh rate transition, such as from sixty Hertz to ninety Hertz. The computing device 100 can store lookup tables for each possible refresh rate transition, or the computing device 100 can store a single lookup table that also includes a column or other entry identifying the refresh rate transition associated with a particular encoded intensity 302 and adjustment value 304.

The lookup table 300 can associate adjustment values 304 with encoded intensity 302 values. The lookup table 300 can store multiple, and/or at least two stored, non-zero adjustment values, such as the adjustment values 5, 6, 7, 4, and 3 associated with encoded intensity levels 30, 35, 40, 45, and 50, respectively. In some examples, the adjustment values 304 outside a predetermined range, such as between thirty and fifty in the example shown in FIG. 3, can be zero and/or null. If the adjustment value 304 for an encoded intensity level at a time of refresh rate transition is zero and/or null, then the computing device 100 will not adjust the intensity of the signal provided to the pixel(s). If the adjustment value 304 for the encoded intensity level at the time of refresh rate transition is non-zero, then the computing device 100 can adjust the intensity of the signal provided to the pixel(s) by the adjustment value 304 stored in the lookup table 300 in association with the encoded intensity 302 and/or refresh rate transition.

In some examples, the adjustment values 304 for given encoded intensity values 302 can be determined experimentally. A computing system can, for example, include a camera that captures images of the display 102 for given encoded intensity levels and refresh rates. The camera and/or computing system can determine and/or measure the luminance of the display 102 based on the captured images. The computing system can populate data upon which the graph 200 shown in FIG. 2B is generated based on the measured luminances for the given encoded intensity levels and refresh rates.

Figure 4:
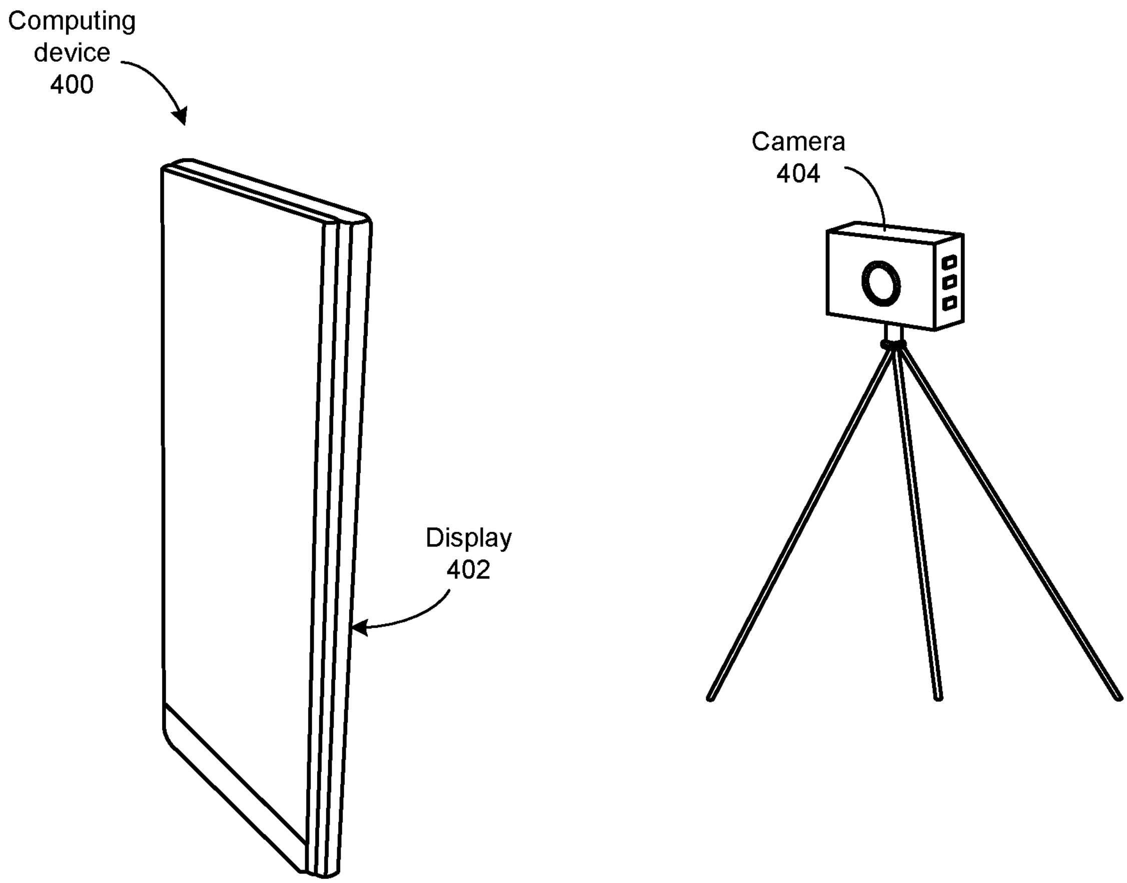
FIG. 4 shows a camera capturing luminance of a display included in a computing device.

FIG. 4 shows a camera 404 capturing luminance of a display 402 included in a computing device 400. The luminance can correspond to average luminance 212A, 212B described above. The computing device 400 and display 402 can include any combination of features of the computing device 100 and display 102 described herein. In some examples, the camera 404 can be included in a computing system that controls the refresh rate and encoded intensity of images presented by the display 402 of the computing device 400. The camera 404 can capture an image presented by the display 402 multiple times at different refresh rates and different encoded intensity levels. The display 402 can present the image multiple times at different refresh rates and different encoded intensity levels. The display 402 can, for example, present a same image, with same pixel values (such as for red, green, and blue) with different refresh rates. The display 402 can, for example, present a same image, with same pixel values (such as for red, green, and blue) with different encoded intensity levels. The different encoded intensity levels can adjust the intensity of the signal for each of the pixels by a fixed amount or a same fraction, or can adjust the values, such as red, green and blue values in an RGB color model or the Y or luma component in an YCbCr color model. The camera 404 and/or computing system that includes the camera 404 can determine, measure, and/or store the luminance of the display 402 based on the captured images.

Figure 5:
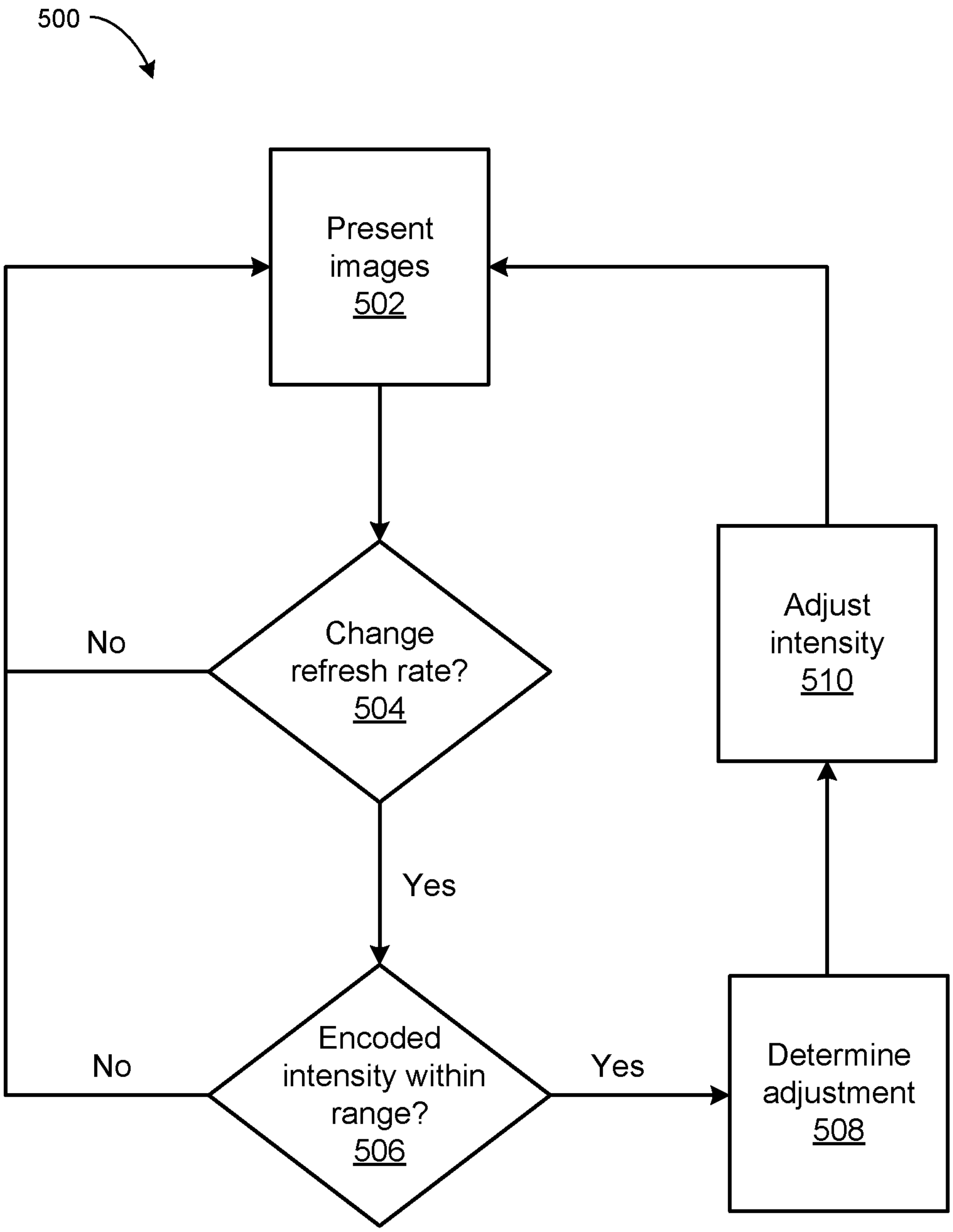
FIG. 5 shows a flowchart of a process for adjusting luminance based on a refresh rate.

FIG. 5 shows a flowchart of a process 500 for adjusting luminance based on a refresh rate. The process 500 can include the computing device 100 presenting images (502) via the display 102. The images can be static or changing, and can be based on output from applications running on the computing device 100. Examples of images presented by the computing device 100 via the display are shown in FIG. 1.

The process 500 can include the computing device 100 determining whether to change the refresh rate of the display 102 (504). The computing device 100 can determine whether to change the refresh rate of the display 102 based on a new application running on the computing device, such as increasing the refresh rate when the computing device 100 transitions from running a less graphic-intensive application such as a web browser to running a more graphic-intensive application such as a video game, and/or reducing the refresh rate when the computing device 100 transitions from running a more graphic-intensive application such as a video to running a less graphic-intensive application such as a web browser. If the computing device 100 will not change the refresh rate, then the computing device 100 can continue presenting images (502).

If the computing device 100 determines that the refresh rate of the display 102 will be and/or has been changed, then the computing device 100 can change the refresh rate and then, based on and/or in response to the change in the refresh rate, the computing device 100 can determine whether an encoded intensity level of the display 102 is within a predetermined range (506). The predetermined range can be a range of encoded intensities within which the intensity of signal for the pixel(s) will be adjusted by a fixed value, or a range within which the adjustment level will be non-zero and/or non-null, such as the range of thirty to fifty in the example of the lookup table 300 shown in FIG. 3. If the computing device 100 determines that the encoded intensity level is not within the predetermined range, then the computing device 100 can continue presenting images (502).

If the computing device 100 determines that the encoded intensity level is within the predetermined range, then the computing device 100 can determine an adjustment level (508). In examples in which the adjustment level is fixed for all encoded intensity levels within the predetermined range, the computing device 100 can determine the adjustment level (508) by retrieving the stored adjustment level from the lookup table 300 or other data structure based on determining that the encoded intensity level is in the predetermined range. In examples in which the adjustment level is different for different encoded intensity levels, the computing device 100 can determine the adjustment level for the encoded intensity of the display 102 at the time of transition of the refresh rate, such as by consulting a lookup table (such as the lookup table 300) that associated encoded intensity levels with adjustment levels, such as the lookup table 300 shown in FIG. 3.

After determining the adjustment level (508), the computing device 100 can adjust the intensity of the signal provided to the pixel(s) (510). The computing device 100 can adjust the intensity of the signal (510) by the determined adjustment level, such as the retrieved adjustment level and/or retrieved adjustment value that the computing device 100 retrieved from the lookup table. In some examples, the computing device 100 can adjust the intensity of the signal (510) by changing one or more register values of an integrated circuit that controls the display 102. In some examples, the computing device 100 can adjust the intensity of the signal (510) by changing a brightness level of the display 102, which can be a software solution that adjusts the red, green, and/or blue input to the pixels by fixed, integer values, or by same, predetermined fractions or their previous values.

In some examples, the computing device 100 can adjust the intensity of signals provided to pixels in a portion of the display 102, such as a single pixel and/or multiple pixels for which the encoded intensity level falls within the predetermined range, and not adjust the intensity of signals provided to pixels in other portions of the display, 102, such as pixels for which the encoded intensity level was not within and/or outside the predetermined range. In some examples, the computing device 100 can adjust the intensity of signals provided to pixels in the entire display 102, and/or all pixels in the display 102.

Figure 6:
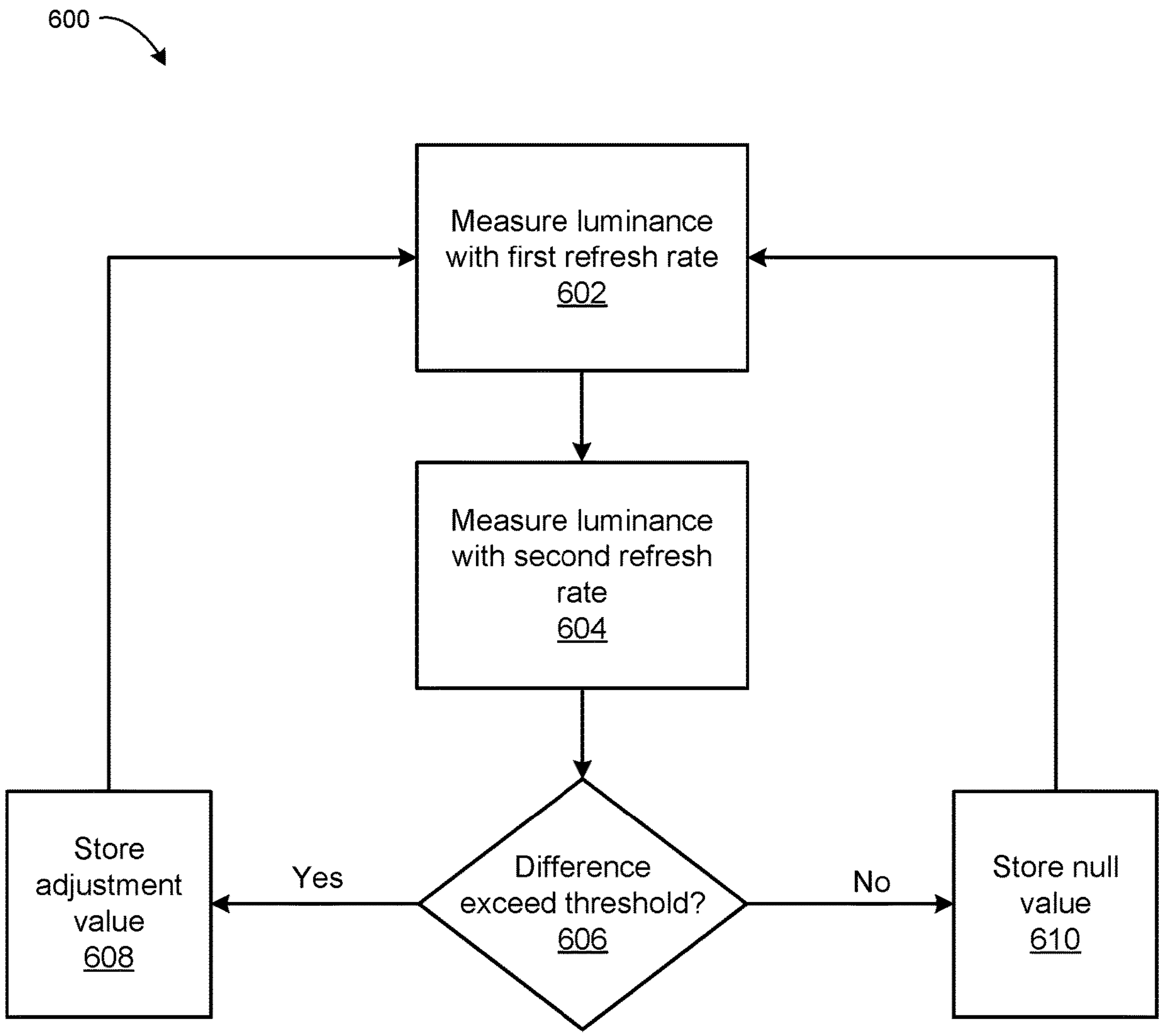
FIG. 6 shows a flowchart of a process for measuring luminance and determining adjustment values.

FIG. 6 shows a flowchart of a process 600 for measuring luminance and determining adjustment values. The process 600 can be performed by a computing system that controls the camera 404 shown in FIG. 4.

The process 600 can include the computing system measuring a luminance 204 with a first refresh rate (602). The computing system can measure the luminance by capturing an image presented by the display 402 of the computing device 400 at the first refresh rate, as discussed with respect to FIG. 4.

The process 600 can include the computing system measuring a luminance 204 with a second refresh rate (604). The computing system can measure the luminance by capturing an image presented by the display 402 of the computing device 400 at the second refresh rate, as discussed with respect to FIG. 4. The image presented by the display 402 at the second refresh rate can be the same image, with a same encoded intensity, as the display 402 presented at the first refresh rate when the computing system measured the luminance with the first refresh rate (602).

After measuring the luminances with the first and second refresh rates (602, 604), the computing system can determine a difference between the luminances. The computing system can determine whether the difference exceeds a threshold (606). The threshold can be a ratio and/or percentage of either the first luminance or second luminance, such as ten percent (10%), or an absolute value. If the difference does exceed the threshold, then the computing system can store an adjustment value (608) in association with an encoded intensity of the image. The adjustment value can be a function of the difference, such as the difference itself or the average of the differences at similar encoded intensity levels (such as encoded intensity levels within a specific and/or predefined range). If the difference does not exceed the threshold, then the computing system can store a null value (610) in association with the encoded intensity of the image. After storing the adjustment value (608) or storing the null value (610), the computing system can continue measuring luminances for first and second refresh rates (602, 604) for different images and/or images with different encoded intensity levels.

Figure 7:
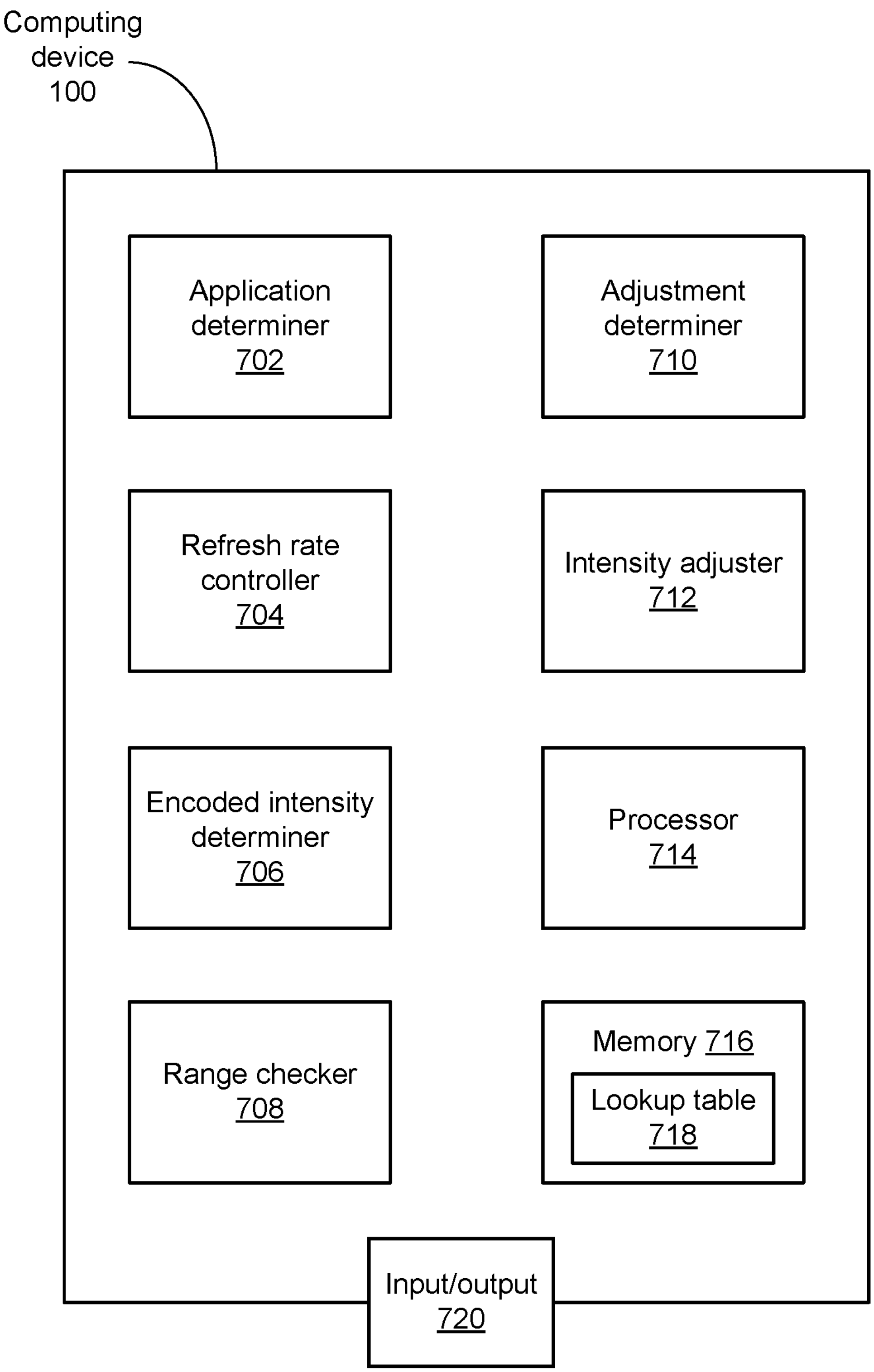
FIG. 7 shows a block diagram of a computing device.

FIG. 7 shows a block diagram of the computing device 100. The computing device 100 can include any combination of features and/or functionalities of the computing devices 100, 400 described herein.

The computing device 100 can include an application determiner 702. The application determiner 702 can determine an application for the computing device 100 to run, launch, and/or execute. The application determiner 702 can determine the application based on user selection or preconfigured settings within the computing device 100, as non-limiting examples.

The computing device 100 can include a refresh rate controller 704. The refresh rate controller 704 can control the refresh rate of the display 102 (not shown in FIG. 7) included in the computing device 100. In some examples, the refresh rate controller 704 can determine the refresh rate based on a type of application running and/or executing on the computing device 100. The computing device 100 can, for example, determine and/or select a low refresh rate when a less graphic-intensive application, such as a web browser, a word processing application, or a spreadsheet application is running and/or executing on the computing device 100, and determine and/or select a high refresh rate when a high graphic-intensive application, such as a video game or a video player, is running and/or executing on the computing device 100.

The computing device 100 can include an encoded intensity determiner 706. The encoded intensity determiner 706 can determine an encoded intensity of at least a portion of the display 102, such as one or more pixels in the display 102, and/or determine the encoded intensity of the entire display 102 when the display 102 transitions from a low refresh rate to a high refresh rate, or when the display 102 transitions from a high refresh rate to a low refresh rate.

The encoded intensity determiner 706 can determine the encoded intensity based on values, such as red, green, and blue values in an RGB color model, provided to the display 102 for illuminating pixels included in the display 102. The encoded intensity determined by the encoded intensity determiner 706 can be a function of the pixel values provided to the display 102, such as a gray level of the pixels. The encoded intensity determiner 706 can determine the encoded intensity level of each pixel individually, and/or can determine an overall encoded intensity for the display 102 based on an average or other function of the encoded intensity levels of the individual pixels.

The computing device 100 can include a range checker 708. The range checker 708 can check and/or determine whether the determined encoded intensity of a pixel and/or the display 102 is within a predetermined range. If the determined encoded intensity is within the predetermined range, then the computing device 100 can adjust the intensity of the signal for the pixel and/or display 102. If the determined encoded intensity is outside the predetermined range, then the computing device 100 can present the image without adjusting the intensity of the signal for the pixel and/or display 102.

The computing device 100 can include an adjustment determiner 710. The adjustment determiner 710 can determine an adjustment level for the pixel and/or display 102. In examples in which the computing device 100 adjusts the intensity of the signals for the pixels by a single value for any encoded intensity level within the predetermined range for a given refresh rate transition, the computing device 100 can determine that the adjustment level is the single value. In examples in which the computing device 100 adjusts the intensity of the signals for the pixels by different levels for different encoded intensity levels, the adjustment determiner 710 can determine a specific adjustment level based on the encoded intensity level, such as by checking a lookup table such as the lookup table 300 shown in FIG. 3.

The computing device 100 can include an intensity adjuster 712. The intensity adjuster 712 can adjust the intensity levels of signals provided to pixels included in the display 102 individually, or can adjust the intensity level of signals provided to pixels in the entire display 102. The intensity adjuster 712 can adjust the intensity level based on the adjustment level determined by the adjustment determiner 710. The intensity adjuster 712 can adjust the intensity level by, for example, changing one or more register values in an integrated circuit that controls the display 102, and/or by changing a encoded intensity level of the display 102, as non-limiting examples. Adjusting the intensity can adjust, change, lower, and/or raise the peak luminance 210B, as described above with respect to FIGS. 2A and 2C.

In some examples, the intensity adjuster 712 can adjust the intensity of signals provided to pixels in a portion of the display 102, such as the pixels for which the encoded intensity level falls within the predetermined range, and not adjust the intensity of signals provided to pixels in other portions of the display, 102, such as pixels for which the encoded intensity level was not within and/or was outside the predetermined range. In some examples, the intensity adjuster 712 can adjust the intensity of signals provided to pixels in the entire display 102, and/or all pixels in the display 102.

The computing device 100 can include at least one processor 714. The at least one processor 714 can execute instructions, such as instructions stored in at least one memory device 716, to cause the computing device 100 to perform any combination of methods, functions, and/or techniques described herein, such as controlling an image presented by a display 102 and/or a luminance of the image presented by the display 102.

The computing device 100 may include at least one memory device 716. The at least one memory device 716 can include a non-transitory computer-readable storage medium. The at least one memory device 716 can store data and instructions thereon that, when executed by at least one processor, such as the processor 714, are configured to cause the computing device 100 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the computing device 100 can be configured to perform, alone, or in combination with the computing device 100, any combination of methods, functions, and/or techniques described herein. The memory 716 can store one or more lookup tables 718, such as the lookup table 300 shown and described with respect to FIG. 3.

The computing device 100 may include at least one input/output node 720. The at least one input/output node 720 may receive and/or send data, such as from and/or to, a server, and/or may receive input and provide output from and to a user. The input and output functions may be combined into a single node, or may be divided into separate input and output nodes. The input/output node 720 can include, for example, the display 102, a camera, a speaker, a microphone, one or more buttons, and/or one or more wired or wireless interfaces for communicating with other computing devices.

Figure 8:
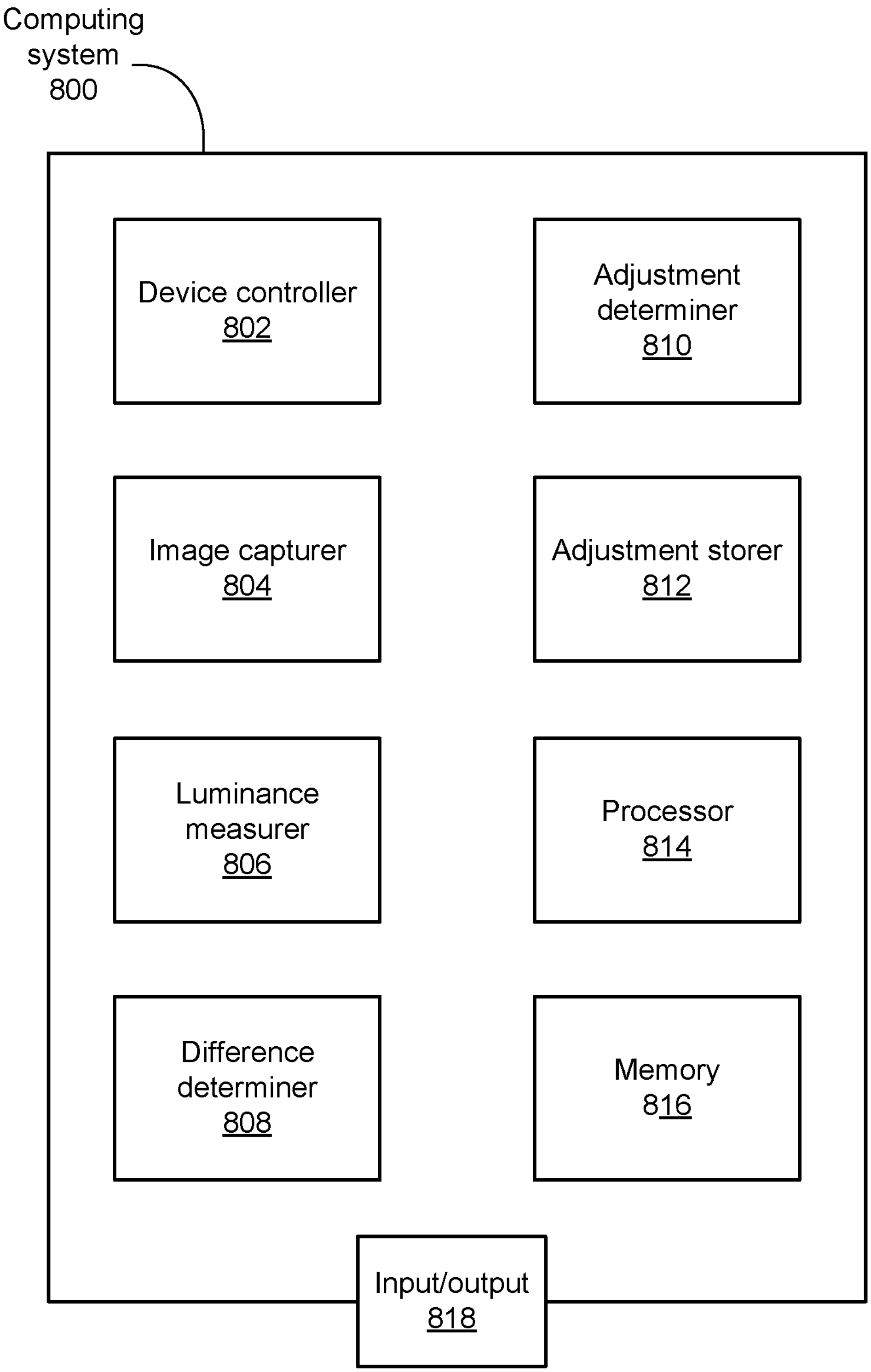
FIG. 8 shows a block diagram of a computing system for determining adjustment values.

FIG. 8 shows a block diagram of a computing system 800 for determining adjustment values. The computing system 800 can measure luminances of a display, such as by capturing the luminance of the display 402 with the camera 404 as shown and described with respect to FIG. 4.

The computing system 800 can include a device controller 802. The device controller 802 can control an image, encoded intensity level, and/or refresh rate of a display, such as the displays 102, 402 described above. The device controller 802 can cause the display 102 to present multiple different images with different encoded intensities at different refresh rates, enabling the computing system 800 to determine luminances for images with different combinations of encoded intensities and refresh rates.

The computing system 800 can include an image capturer 804. The image capturer 804 can include a camera, such as the camera 404 shown and described with respect to FIG. 4. The image capturer 804 can capture images of the display 102, 402 while the display 102, 402 is presenting images with varying encoded intensity levels and varying refresh rates.

The computing system 800 can include a luminance measurer 806. The luminance measurer 806 can measure the luminance of images of the display 102, 402 that were captured by the image capturer 804. An example of the measured luminances is the average luminances 212A, 212B shown and described with respect to FIGS. 2A and 2C. The luminance measurer 806 can store the measured luminances, in association with the encoded intensity levels and refresh rates of the images for which the luminance was measured, in memory 816.

The computing system 800 can include a difference determiner 808. The difference determiner 808 can determine differences in luminance between images that had the same encoded intensity levels but different refresh rates. The difference determiner 808 can store the determined differences in luminance for images with same encoded intensity levels in association with the different refresh rates in memory 816.

The computing system 800 can include an adjustment determiner 810. The adjustment determiner 810 can determine whether the differences determined by the difference determiner 808 meet or exceed a threshold, such as ten percent (10%) of a luminance value. If a difference does not exceed the threshold for a given refresh rate transition, then the adjustment determiner 810 can determine that no adjustment to the luminance should be made, and/or that the adjustment level should be zero or null.

If the difference does meet or exceed the threshold for the given refresh rate transition, then the adjustment determiner 810 can determine a non-zero value by which the intensity of the signal for the pixel should be adjusted for the given refresh rate transition. In examples in which a single adjustment value is used to change the intensity of the signal of the pixels for all encoded intensity levels within a predetermined range within which the difference exceeded the threshold, the adjustment determiner 810 can determine an average value, and/or rounded average value, of the differences that met or exceeded the threshold. The average value can be the adjustment level for all encoded intensity levels within the predefined range. In examples in which different adjustment levels are used for different encoded intensity levels, the adjustment determiner 810 can the determine the adjustment level as the difference for each encoded intensity level that met or exceeded the threshold.

The computing system 800 can include an adjustment storer 812. The adjustment storer 812 can store the adjustment level(s) determined by the adjustment determiner 810. In examples in which a single adjustment value is used to change the intensity of the signal for the pixel for all encoded intensity levels within a predetermined ranged within which the difference exceeded the threshold, the adjustment storer 812 can store the single adjustment value. In examples in which different adjustment levels are used for different encoded intensity levels, the adjustment storer 812 can store multiple adjustment values in association with multiple encoded intensity levels, such as in a table such as in the table 300 shown in FIG. 3.

The computing system 800 can include at least one processor 814. The at least one processor 814 can execute instructions, such as instructions stored in at least one memory device 816, to cause the computing system 800 to perform any combination of methods, functions, and/or techniques described herein.

The computing system 800 may include at least one memory device 816. The at least one memory device 816 can include a non-transitory computer-readable storage medium. The at least one memory device 816 can store data and instructions thereon that, when executed by at least one processor, such as the processor 814, are configured to cause the computing system 800 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the computing system 800 can be configured to perform, alone, or in combination with the computing system 800, any combination of methods, functions, and/or techniques described herein. The memory 816 can store one or more lookup tables stored by the adjustment storer 812, such as the lookup table 300 shown and described with respect to FIG. 3.

The computing system 800 may include at least one input/output node 818. The at least one input/output node 818 may receive and/or send data, such as from and/or to, a server, and/or may receive input and provide output from and to a user. The input and output functions may be combined into a single node, or may be divided into separate input and output nodes. The input/output node 818 can include, for example, a display, a camera such as the camera 404 shown and described with respect to FIG. 4, a speaker, a microphone, one or more buttons, and/or one or more wired or wireless interfaces for communicating with other computing devices.

Figure 9:
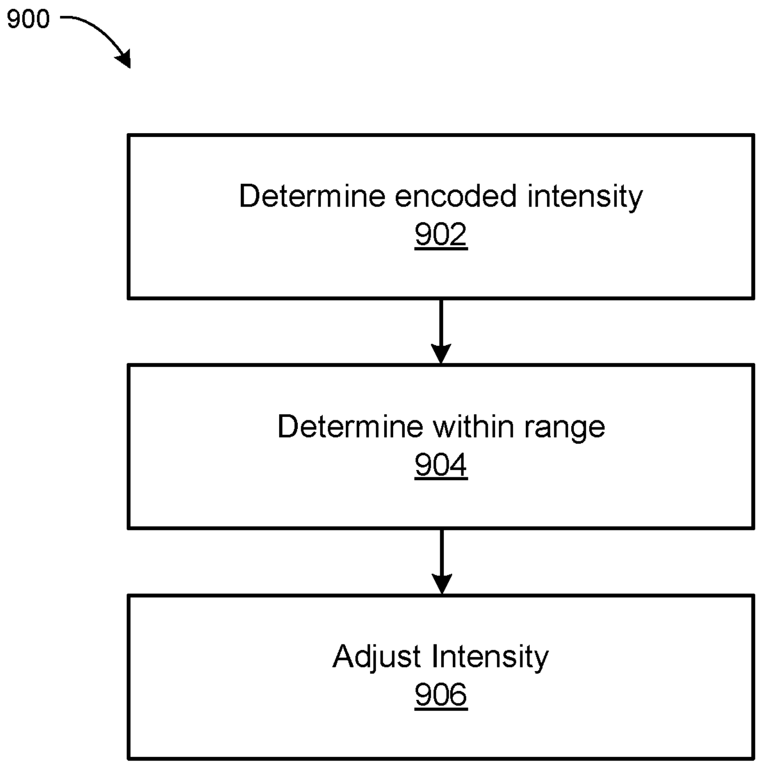
FIG. 9 shows a flowchart of a method.

FIG. 9 shows a flowchart of a method 900. The method 900 can include determining an encoded intensity (902). Determining the encoded intensity (902) can include determining, in response to a change in a refresh rate of a display, an encoded intensity of at least a portion of an image presented by the display. The method can include determining that the encoded intensity is within a predetermined range (904). The method can include adjusting the intensity (906). Adjusting the intensity (906) can include, based on determining that the encoded intensity is within the predetermined range, adjusting an intensity of a signal for the portion of the image.

In some examples, the change in the refresh rate of the display can include an increase in the refresh rate of the display, and the adjusting the intensity of the signal for the portion of the image can include reducing a peak luminance of the portion of the image.

In some examples, the change in the refresh rate of the display is in response to launching an application on the computing device.

In some examples, the change in the refresh rate of the display includes a transition from a refresh rate of sixty Hertz to ninety Hertz.

In some examples, the change in the refresh rate of the display includes a transition from a refresh rate of sixty Hertz to one hundred and twenty Hertz.

In some examples, the change in the refresh rate of the display includes a transition from a refresh rate of ninety Hertz to one hundred and twenty Hertz.

In some examples, the change in the refresh rate of the display includes a transition from a refresh rate of ninety Hertz to sixty Hertz.

In some examples, the change in the refresh rate of the display includes a transition from a refresh rate of one hundred and twenty Hertz to sixty Hertz.

In some examples, the change in the refresh rate of the display includes a transition from a refresh rate of one hundred and twenty Hertz to ninety Hertz.

In some examples, the encoded intensity of the portion of the image includes a gray level of the portion of the image.

In some examples, the portion of the image includes a single pixel included in the display.

In some examples, the portion of the image includes all pixels of the display.

In some examples, the adjusting the intensity of the signal for the portion of the image comprises changing a register value of an integrated circuit that controls the display.

In some examples, the adjusting the intensity of the signal for the portion of the image comprises changing a brightness level of the display.

In some examples, the method 900 further includes retrieving an adjustment value from a lookup table based on the encoded intensity, the lookup table including at least two stored non-zero adjustment values. The adjusting the intensity of the signal for the portion of the image can include adjusting the intensity of the signal for the portion of the image based on the retrieved adjustment value.

In some examples, the method 900 further includes retrieving an adjustment value from a lookup table based on the encoded intensity and the change in the refresh rate of the display, the lookup table including at least two stored non-zero adjustment values. The adjusting the intensity of the signal for the portion of the image can include adjusting the intensity of the signal for the portion of the image based on the retrieved adjustment value.

Figure 10:
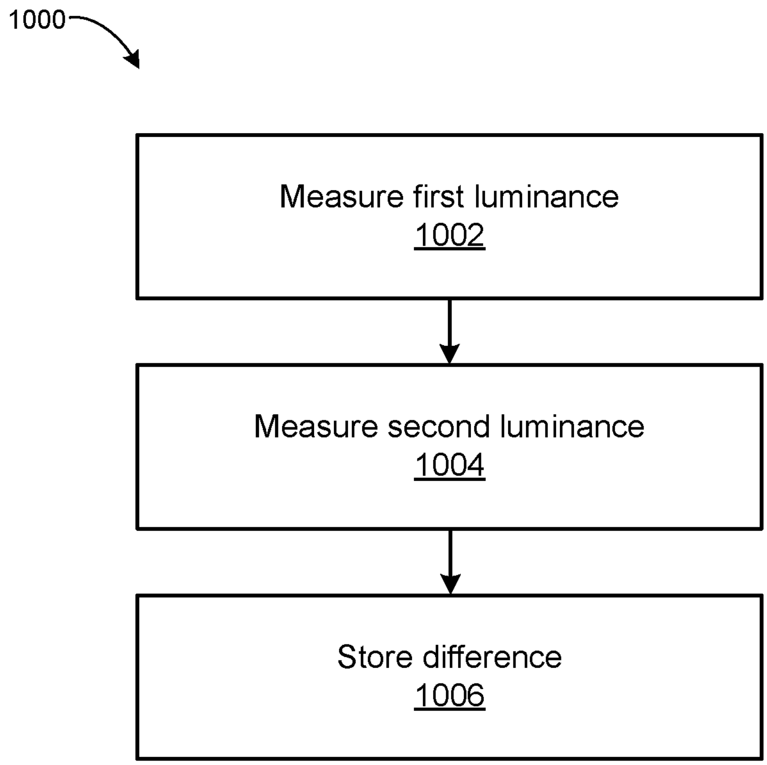
FIG. 10 shows a flowchart of a method.

FIG. 10 shows a flowchart of a method 1000. The method 1000 can include measuring a first luminance (1002). Measuring the first luminance (1002) can include measuring a first luminance of a display when the display is presenting an image with a first encoded intensity and a first refresh rate. The method 1000 can include measuring a second luminance (1004). Measuring the second luminance (1004) can include measuring a second luminance of the display when the display is presenting the image with the first encoded intensity and a second refresh rate. The method 1000 can include storing a difference (1006). Storing the difference (1006) can include storing a difference between the first luminance and the second luminance.

In some examples, the method 1000 further includes measuring a third luminance of the display when the display is presenting the image with a second encoded intensity and the first refresh rate, measuring a fourth luminance of the display when the display is presenting the image with the second encoded intensity and a second refresh rate, storing a difference between the third luminance and the fourth luminance, and generating a lookup table. The lookup table can associate the first encoded intensity with the difference between the first luminance and the second luminance, and the second encoded intensity with the difference between the third luminance and the fourth luminance.

In some examples, the method 1000 further includes determining that the difference between the first luminance and the second luminance exceeds a threshold. The storing the difference between the first luminance and the second luminance can include storing the difference between the first luminance and the second luminance based on determining that the difference between the first luminance and the second luminance exceeds a threshold.

In some examples, the method 1000 further includes measuring a third luminance of the display when the display is presenting the image with a second encoded intensity and the first refresh rate, measuring a fourth luminance of the display when the display is presenting the image with the second encoded intensity and the second refresh rate, determining that a difference between the third luminance and the fourth luminance is less than the threshold, and generating a lookup table. The lookup table can associate the first encoded intensity with the difference between the first luminance and the second luminance, and the second encoded intensity with a null value.

Figure 11:
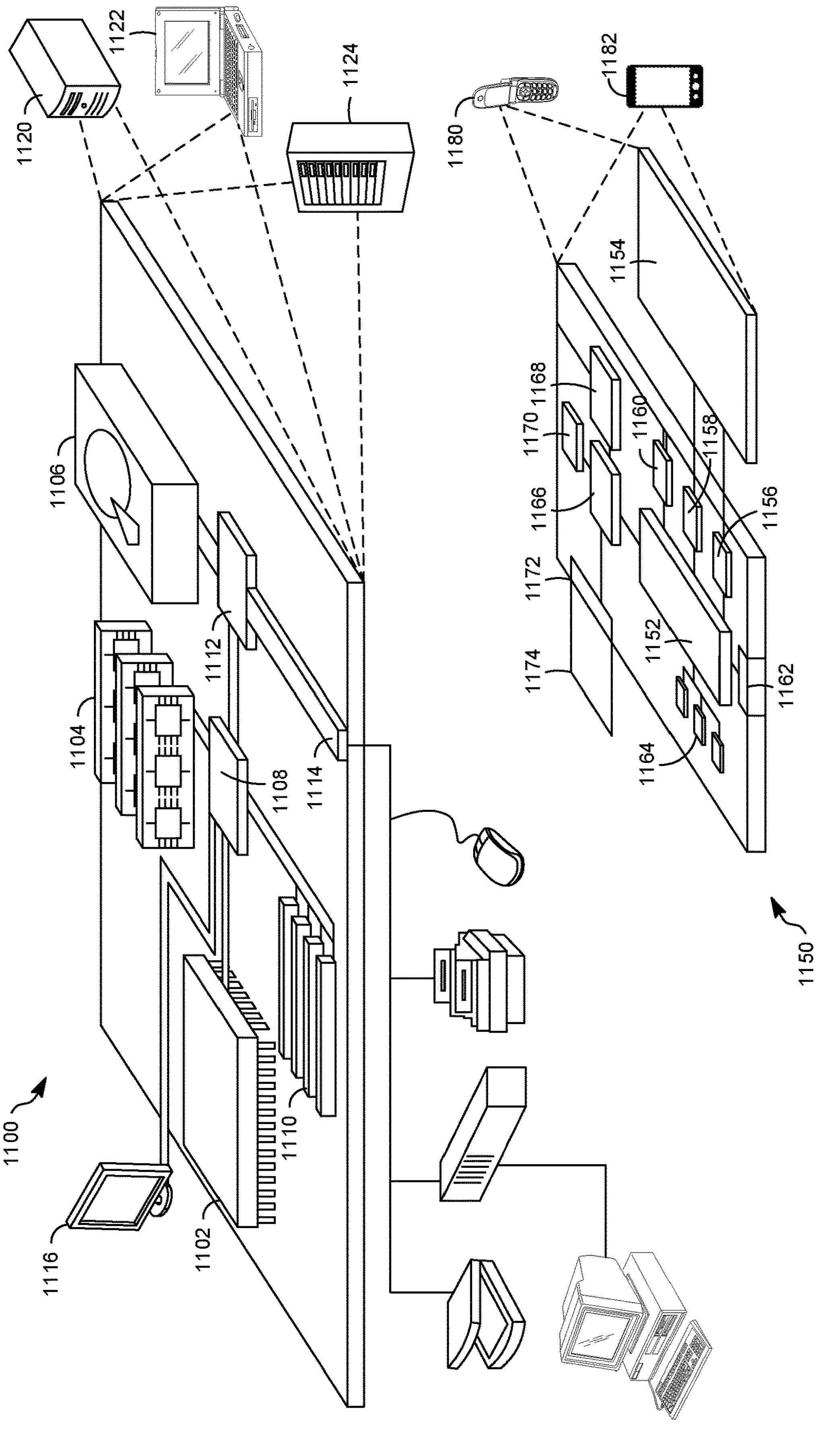
FIG. 11 shows an example of a computer device and a mobile computer device that can be used to implement the techniques described here.

FIG. 11 shows an example of a generic computer device 1100 and a generic mobile computer device 1150, which may be used with the techniques described here. Computing device 1100, which can be an example of the computing system 800, is intended to represent various forms of digital computers, such as laptops, desktops, tablets, workstations, personal digital assistants, televisions, servers, blade servers, mainframes, and other appropriate computing devices. Computing device 1150, which can be an example of the computing device 100, is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. The processor 1102 can be a semiconductor-based processor. The memory 1104 can be a semiconductor-based memory. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provided in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provided as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

In the following some examples are described.

Example 1: A non-transitory computer-readable storage medium comprising instructions stored thereon that, when executed by at least one processor, are configured to cause a computing device to:

determine, in response to a change in a refresh rate of a display, an encoded intensity of at least a portion of an image presented by the display;

determine that the encoded intensity is within a predetermined range; and based on determining that the encoded intensity is within the predetermined range, adjust an intensity of a signal for the portion of the image.

Example 2: The non-transitory computer-readable storage medium of example 1, wherein:

the change in the refresh rate of the display includes an increase in the refresh rate of the display; and the adjusting the intensity of the signal for the portion of the image includes reducing a peak luminance of the portion of the image.

Example 3: The non-transitory computer-readable storage medium of example 1, wherein:

the change in the refresh rate of the display includes a decrease in the refresh rate of the display; and the adjusting the intensity of the signal for the portion of the image includes increasing a peak luminance of the portion of the image.

Example 4: The non-transitory computer-readable storage medium of at least one of the preceding examples, wherein the change in the refresh rate of the display is in response to launching an application on the computing device.

Example 5: The non-transitory computer-readable storage medium of at least one of the preceding examples, wherein the change in the refresh rate of the display includes a transition from a refresh rate of sixty Hertz to ninety Hertz.

Example 6: The non-transitory computer-readable storage medium of at least one of the preceding examples, wherein the encoded intensity of the portion of the image includes a gray level of the portion of the image.

Example 7: The non-transitory computer-readable storage medium of at least one of the examples 1 to 5, wherein the encoded intensity of the portion of the image includes pixel values such red, green, and blue values in an RGB color model.

Example 8: The non-transitory computer-readable storage medium of at least one of the preceding examples, wherein the portion of the image includes a single pixel included in the display.

Example 9: The non-transitory computer-readable storage medium of at least one of the preceding examples wherein the portion of the image includes all pixels of the display.

Example 10: The non-transitory computer-readable storage medium of at least one of the preceding examples, wherein the adjusting the intensity of the signal for the portion of the image comprises changing a register value of an integrated circuit that controls the display.

Example 11 The non-transitory computer-readable storage medium of at least one of the preceding examples, wherein the adjusting the intensity of the signal for the portion of the image comprises changing a brightness level of the display.

Example 12: The non-transitory computer-readable storage medium of at least one of the preceding examples, wherein the instructions are further configured to cause the computing device to:

retrieve an adjustment value from a lookup table based on the encoded intensity, the lookup table including at least two stored non-zero adjustment values, wherein the adjusting the intensity of the signal for the portion of the image includes adjusting the intensity of the signal for the portion of the image based on the retrieved adjustment value.

Example 13: The non-transitory computer-readable storage medium of at least one of the preceding examples, wherein the instructions are further configured to cause the computing device to:

retrieve an adjustment value from a lookup table based on the encoded intensity and the change in the refresh rate of the display, the lookup table including at least two stored non-zero adjustment values, wherein the adjusting the intensity of the signal for the portion of the image includes adjusting the intensity of the signal for the portion of the image based on the retrieved adjustment value.

Example 14: A method comprising:

measuring a first luminance of a display when the display is presenting an image with a first encoded intensity and a first refresh rate;

measuring a second luminance of the display when the display is presenting the image with the first encoded intensity and a second refresh rate; and storing a difference between the first luminance and the second luminance.

Example 15: The method of example 14, further comprising:

measuring a third luminance of the display when the display is presenting the image with a second encoded intensity and the first refresh rate;

measuring a fourth luminance of the display when the display is presenting the image with the second encoded intensity and a second refresh rate;

storing a difference between the third luminance and the fourth luminance; and generating a lookup table, the lookup table associating:

the first encoded intensity with the difference between the first luminance and the second luminance; and the second encoded intensity with the difference between the third luminance and the fourth luminance.

Example 16: The method of example 14 or 15, further comprising:

determining that the difference between the first luminance and the second luminance exceeds a threshold, wherein the storing the difference between the first luminance and the second luminance comprises storing the difference between the first luminance and the second luminance based on determining that the difference between the first luminance and the second luminance exceeds a threshold.

Example 17: The method of example 16, further comprising:

measuring a third luminance of the display when the display is presenting the image with a second encoded intensity and the first refresh rate;

measuring a fourth luminance of the display when the display is presenting the image with the second encoded intensity and the second refresh rate;

determining that a difference between the third luminance and the fourth luminance is less than the threshold; and generating a lookup table, the lookup table associating:

the first encoded intensity with the difference between the first luminance and the second luminance; and the second encoded intensity with a null value.

Example 18: A method comprising:

determining, by a computing device in response to a change in a refresh rate of a display, an encoded intensity of at least a portion of an image presented by the display;

determining that the encoded intensity is within a predetermined range; and based on determining that the encoded intensity is within the predetermined range, adjusting an intensity of a signal for the portion of the image.

Example 19: The method of example 18, wherein:

the change in the refresh rate of the display includes an increase in the refresh rate of the display; and the adjusting the intensity of the signal for the image includes reducing the intensity of the signal for the portion of the image.

Example 20: The method of example 18 or 19, wherein the encoded intensity of the portion of the image includes a gray level of the portion of the image.

Example 21: The method of at least one of the examples 18 to 20, wherein the adjusting the intensity of the signal for the portion of the image comprises changing a brightness level of the display.

Example 22: The method of at least one of the examples 18 to 21, further comprising:

retrieving an adjustment value from a lookup table based on the encoded intensity, the lookup table including at least two stored non-zero adjustment values, wherein the adjusting the intensity of the signal for the image includes adjusting the intensity of the signal for the image based on the retrieved adjustment value.

What is claimed is:

1. A non-transitory computer-readable storage medium comprising instructions stored thereon that, when executed by at least one processor, are configured to cause a computing device to:

determine, in response to a change in a refresh rate of a display, an encoded intensity of at least a portion of an image presented by the display;

determine that the encoded intensity is within a predetermined range; and based on determining that the encoded intensity is within the predetermined range, adjust an intensity of a signal for the portion of the image, wherein the adjusting the intensity of the signal for the portion of the image is based on an adjustment value retrieved from a lookup table using the encoded intensity, the lookup table associating:

a first encoded intensity with a difference between:

(i) a first luminance produced when an image is presented using the first encoded intensity and a first refresh rate, and (ii) a second luminance produced when the image is presented using the first encoded intensity and a second refresh rate; and a second encoded intensity with a difference between:

(iii) a third luminance produced when the image is presented using the second encoded intensity and the first refresh rate, and (iv) a fourth luminance produced when the image is presented using the second encoded intensity and the second refresh rate.

2. The non-transitory computer-readable storage medium of claim 1, wherein the change in the refresh rate of the display is in response to launching an application on the computing device.

3. The non-transitory computer-readable storage medium of claim 1, wherein the change in the refresh rate of the display includes a transition from a refresh rate of sixty Hertz to ninety Hertz.

4. The non-transitory computer-readable storage medium of claim 1, wherein the encoded intensity of the portion of the image includes a gray level of the portion of the image.

5. The non-transitory computer-readable storage medium of claim 1, wherein the encoded intensity of the portion of the image includes pixel values such red, green, and blue values in an RGB color model.

6. The non-transitory computer-readable storage medium of claim 1, wherein the portion of the image includes a single pixel included in the display.

7. The non-transitory computer-readable storage medium of claim 1, wherein the portion of the image includes all pixels of the display.

8. The non-transitory computer-readable storage medium of claim 1, wherein the adjusting the intensity of the signal for the portion of the image comprises changing a register value of an integrated circuit that controls the display.

9. The non-transitory computer-readable storage medium of claim 1, wherein the adjusting the intensity of the signal for the portion of the image comprises changing a brightness level of the display.

10. The non-transitory computer-readable storage medium of claim 1, wherein the instructions are further configured to cause the computing device to:

retrieve an adjustment value from a lookup table based on the encoded intensity, the lookup table including at least two stored non-zero adjustment values, wherein the adjusting the intensity of the signal for the portion of the image includes adjusting the intensity of the signal for the portion of the image based on the retrieved adjustment value.

11. The non-transitory computer-readable storage medium of claim 1, wherein the instructions are further configured to cause the computing device to:

retrieve an adjustment value from a lookup table based on the encoded intensity and the change in the refresh rate of the display, the lookup table including at least two stored non-zero adjustment values, wherein the adjusting the intensity of the signal for the portion of the image includes adjusting the intensity of the signal for the portion of the image based on the retrieved adjustment value.

12. The non-transitory computer-readable storage medium of claim 1, wherein the predetermined range extends from a first positive value to a second positive value.

13. The non-transitory computer-readable storage medium of claim 1, wherein:

the change in the refresh rate of the display includes an increase in the refresh rate of the display; and the adjusting the intensity of the signal for the portion of the image includes reducing a peak luminance of the portion of the image.

14. A method comprising:

measuring a first luminance of a display when the display is presenting an image with a first encoded intensity and a first refresh rate;

measuring a second luminance of the display when the display is presenting the image with the first encoded intensity and a second refresh rate;

storing a difference between the first luminance and the second luminance;

measuring a third luminance of the display when the display is presenting the image with a second encoded intensity and the first refresh rate;

measuring a fourth luminance of the display when the display is presenting the image with the second encoded intensity and the second refresh rate; and storing a difference between the third luminance and the fourth luminance; and generating a lookup table, the lookup table associating:

the first encoded intensity with the difference between the first luminance and the second luminance; and the second encoded intensity with the difference between the third luminance and the fourth luminance.

15. The method of claim 14, further comprising:

determining that the difference between the first luminance and the second luminance exceeds a threshold, wherein the storing the difference between the first luminance and the second luminance comprises storing the difference between the first luminance and the second luminance based on determining that the difference between the first luminance and the second luminance exceeds the threshold.

16. A method comprising:

measuring a first luminance of a display when the display is presenting an image with a first encoded intensity and a first refresh rate;

measuring a second luminance of the display when the display is presenting the image with the first encoded intensity and a second refresh rate;

determining that a difference between the first luminance and the second luminance exceeds a threshold;

storing the difference between the first luminance and the second luminance, wherein the storing the difference between the first luminance and the second luminance comprises storing the difference between the first luminance and the second luminance based on determining that the difference between the first luminance and the second luminance exceeds the threshold;

measuring a third luminance of the display when the display is presenting the image with a second encoded intensity and the first refresh rate;

measuring a fourth luminance of the display when the display is presenting the image with the second encoded intensity and the second refresh rate;

determining that a difference between the third luminance and the fourth luminance is less than the threshold; and generating a lookup table, the lookup table associating:

the first encoded intensity with the difference between the first luminance and the second luminance; and the second encoded intensity with a zero or null value.

17. A method comprising:

determining, by a computing device in response to a change in a refresh rate of a display, an encoded intensity of at least a portion of an image presented by the display;

determining that the encoded intensity is within a predetermined range; and based on determining that the encoded intensity is within the predetermined range, adjusting an intensity of a signal for the portion of the image, wherein the adjusting the intensity of the signal for the portion of the image is based on an adjustment value retrieved from a lookup table using the encoded intensity, the lookup table associating:

a first encoded intensity with a difference between:

(i) a first luminance produced when an image is presented using the first encoded intensity and a first refresh rate, and (ii) a second luminance produced when the image is presented using the first encoded intensity and a second refresh rate; and a second encoded intensity with a difference between:

(iii) a third luminance produced when the image is presented using the second encoded intensity and the first refresh rate, and (iv) a fourth luminance produced when the image is presented using the second encoded intensity and the second refresh rate.

18. The method of claim 17, wherein the encoded intensity of the portion of the image includes a gray level of the portion of the image.

19. The method of claim 17, further comprising:

retrieving an adjustment value from a lookup table based on the encoded intensity, the lookup table including at least two stored non-zero adjustment values, wherein the adjusting the intensity of the signal for the image includes adjusting the intensity of the signal for the image based on the retrieved adjustment value.

20. The method of claim 17, wherein:

the change in the refresh rate of the display includes an increase in the refresh rate of the display; and the adjusting the intensity of the signal for the portion of the image includes reducing a peak luminance of the portion of the image.

21. A non-transitory computer-readable storage medium comprising instructions stored thereon that, when executed by at least one processor, are configured to cause a computing device to:

determine, in response to a change in a refresh rate of a display, an encoded intensity of at least a portion of an image presented by the display;

determine that the encoded intensity is within a predetermined range; and based on determining that the encoded intensity is within the predetermined range, adjust an intensity of a signal for the portion of the image, wherein the adjusting the intensity of the signal for the portion of the image is based on an adjustment value retrieved from a lookup table using the encoded intensity, the lookup table associating:

a first encoded intensity with a difference between:

(i) a first luminance produced when an image is presented using the first encoded intensity and a first refresh rate, and (ii) a second luminance produced when the image is presented using the first encoded intensity and a second refresh rate, as a result of a difference between the first luminance and the second luminance being above a threshold; and a second encoded intensity with a zero or null value, as a result of a difference between (iii) a third luminance produced when the image is presented using the second encoded intensity and the first refresh rate, and (iv) a fourth luminance produced when the image is presented using the second encoded intensity and the second refresh rate, being below the threshold.

22. A method comprising:

determining, by a computing device in response to a change in a refresh rate of a display, an encoded intensity of at least a portion of an image presented by the display;

determining that the encoded intensity is within a predetermined range; and based on determining that the encoded intensity is within the predetermined range, adjusting an intensity of a signal for the portion of the image, wherein the adjusting the intensity of the signal for the portion of the image is based on an adjustment value retrieved from a lookup table using the encoded intensity, the lookup table associating:

a first encoded intensity with a difference between:

(i) a first luminance produced when an image is presented using the first encoded intensity and a first refresh rate, and (ii) a second luminance produced when the image is presented using the first encoded intensity and a second refresh rate, as a result of a difference between the first luminance and the second luminance being above a threshold; and a second encoded intensity with a zero or null value, as a result of a difference between (iii) a third luminance produced when the image is presented using the second encoded intensity and the first refresh rate, and (iv) a fourth luminance produced when the image is presented using the second encoded intensity and the second refresh rate, being below the threshold.

* * * * *